Patented Jan. 5, 1937

2,066,574

UNITED STATES PATENT OFFICE 2,066,574

METHOD OF PREPARING FOOD CONCENTRATES

Bruno P. Pilorz and Bernard J. Butler, Honolulu, Territory of Hawaii, assignors to California Packing Corporation, San Francisco, Calif., a corporation of New York No Drawing. Application June 9, 1933
Serial No. 675,108

7 Claims. (Cl. 99—204)

This invention relates to a method of producing food concentrates and more particularly to a method or process by which pineapple or other fruit may be converted into a concentrate which may be utilized as the base for many products in candy, ice cream, baking, fountain syrup and other food industries.

It is an object of this invention to provide a food concentrate from pineapple or other fruit in which the valuable constituents originally present in the fresh fruit are preserved in the final product.

Another object of this invention is to provide a method of preparing pineapple or other fruit concentrates in which vitamins B and C, the enzymes or digestive ferments such as bromelin, and fruit acids such as citric acid, are preserved in the final product.

Another object of this invention is to provide a method of preparing pineapple or other fruit concentrates in which method pineapple or other fruit is impregnated with syrup, which syrup is prepared from cane sugar and invert sugars so that all subsequent concentration or evaporation, crystallization or graining is prevented, subjecting the mixed syrup and fruit to the influence of pressure to collapse the cell walls of the fruit and then evaporating the fruit and syrup under the influence of vacuum or reduced pressure at a temperature below the temperature at which the vitamin enzyme content of the fruit will be destroyed.

Other objects and advantages of this invention it is believed will be apparent from the following detailed description of a preferred embodiment thereof.

We have discovered that food concentrates may be prepared from pineapple or other fruit so as to retain in the fruit the valuable constituents thereof such as the vitamins B and C, the enzymes or digestive ferments such as bromelin, and the fruit acids such, for example, as citric acid in the case of the pineapple, by first adding sugar or syrup to the fruit, then subjecting the fruit to the action of the pressure in a closed vessel to rupture the cell structure of the fruit, and then concentrating the mixture of fruit and syrup or sugar under the influence of a vacuum or reduced pressure so that the temperature of boiling of the solution under the influence of the vacuum is less than the temperature at which the enzyme and vitamin content of the fruit will be destroyed.

We have discovered by such a process carried out in temperatures below 115° F. that the vitamins B and C are not destroyed, nor are the enzyme or digestive ferments such as bromelin, which is not destroyed in temperatures below 144° F. and that the volatile acid content of the fruit such, for example, as citric acid which, combined with the fruit esters of the fruit, give to the fruit its distinctive character, flavor and zest is retained in the fruit rather than being eliminated therefrom as is the result in processes heretofore followed where the concentrates are formed by draining the liquid from the pulp portion of the fruit.

In carrying out the process embodying our invention, fruit such, for example, as pineapple, in predetermined amount is first pulverized, comminuted or ground and is then thoroughly mixed with a predetermined amount of a 60° to 80° Brix syrup or its dry sugar equivalent, part of which syrup has been inverted in order to avoid subsequent crystallization. We have found that in order to avoid subsequent crystallization or graining of the fruit, that the invert sugar content should be approximately 30 to 35% of the content of the final product and that the total sugar content of the final product should be approximately 75%.

The pulverized fruit with the syrup added thereto is mixed together and is then placed in a tightly closed vessel made of stainless steel or other non-corrosive material and in such container is subjected to a relatively high air pressure of, for example, approximately 90 lbs. per square inch. The subjecting of the fruit pulp and syrup to the influence of fluid pressure as thus described results in the collapse of the cell walls of the pulp of the fruit and aids in the subsequent concentration or evaporation of the fruit and syrup.

The mixture is then drawn to the boiling chamber, preferably a single effect evaporator, which is preferably likewise made of stainless steel or other non-corrosive material, and which is so constructed that a vacuum of approximately 28 inches mercury may be maintained in it in the case of concentration of pineapple. Mounted within the single effect evaporator is a mechanical stirrer to keep the fruit moving over the heating surface of the evaporator to prevent burning of the fruit and to speed up heat transfer and evaporation. The mechanical stirrer thus provides an agitator to prevent localized overheating and to aid in the heat transfer and evaporation of the water from the mixture of syrup and fruit.

Low pressure steam is preferably used in the jacketed heating surfaces to bring the temperature of fruit and syrup mixture to approximately 96° F., the boiling point of the mixture at a vacuum of 28 inches of mercury. The water vapors arising from the boiling mixture are removed by a condenser and vacuum pump or jet ejector. The construction and operation of such single effect evaporator is believed well understood in the art so that their construction and operation need not be specifically described in detail by applicants.

After the soluble solids have been concentrated to the desired percentage, the fruit mass is removed from the evaporator and then may be packed in the manner desired or may be further concentrated in any desired manner. It has been found preferable to concentrate the fruit and syrup to about 20% of the original water content but it has been found that it is impracticable to endeavor to concentrate the fruit and syrup mass to this degree in the drying chamber of the evaporator due to the inability of agitating means of normal construction to maintain the fruit agitated sufficiently to prevent local overheating. We therefore prefer to remove the fruit and syrup mass from the single effect evaporator after it has been concentrated to approximately 25% of its original water content, and to then subject the mass to the influence of a heated blast of air blown over the fruit, which air is heated to approximately 120° F. until the desired water concentration has been reached. The concentrate is then packed preferably in a material impermeable to light rays such, for example, as tin cans, water-proof fiber board containers, or wooden pails. We have found that if the concentrate is not protected against the influence of the light rays that upon storing a darkening and gradual deterioration will set in while if stored in containers impervious to light rays, its preservation will remain indefinitely.

The low water content, 20%, and the high sugar content, 75%, serve to prevent the growth of moulds or ferments in the final product, thus when properly packed, indefinitely preserving the natural color, aroma and flavor of the fresh fruit. As an illustrative example, 100 lbs. of fresh fruit, containing approximately 1.0% of fiber, 0.9% of acid, 14.25% of sugars, 83.85% of water, are syruped by the addition of 21.5 lbs. of sugar, either dry or in the form of a 60° to 80° Brix syrup; and the mixture thus produced is subject to the influence of pressure to rupture the cells of the fiber of the fruit. The fruit mixture thus provided is concentrated in the evaporator to where the mixture contains approximately 24.64% of water. The final product is then dried with the blast of heated air to reduce the water content to approximately 20%. In the actual illustrative example given, the water content is reduced to 18.15% water. The concentrate thus formed contains

| | Percent |
|---|---|
| Fiber | 2.20 |
| Acid | 1.95 |
| Sugar | 77.70 |
| Water | 18.15 |

Having fully described the preferred method of carrying out our invention, it is to be understood that we do not wish to be limited to the details herein set forth which are given for the purposes of illustration only of a preferred manner of carrying out our process, but our invention is of the full scope of the appended claims.

We claim:

1. A method of preparing food concentrates, including adding sugar to a fruit, subjecting the mixture of fruit and sugar to pressure of air in a closed container to rupture the cell structure of the fruit and impregnate the ruptured cells of the fruit with the sugar, and then concentrating the fruit and sugar under the influence of a reduced pressure and at a relatively low temperature.

2. A method of preparing food concentrates, which includes syruping comminuted fruit with a syrup including invert sugar, subjecting the syruped fruit to fluid pressure in a closed container to rupture the cell structures of the fruit and impregnate the ruptured cell structure with the syrup, and then concentrating the fruit and syrup under the influence of a reduced pressure to retain the fruit acid, vitamins B and C, and the enzymes within the concentrate.

3. A method of preparing a pineapple concentrate which includes syruping pulverized pineapple with a syrup including a relatively high invert sugar content to prevent graining of the concentrate, subjecting the syruped fruit to the action of pressure to rupture the cells of the fruit, and then boiling the syruped fruit under the influence of reduced pressure and at a temperature below the temperature at which the vitamins B and C would be destroyed.

4. A method of preparing food concentrates, including the steps of sugaring a fruity foodstuff, placing the sugared foodstuff in a closed chamber under fluid pressure to rupture the cell structure and impregnate the ruptured cell structure with the sugar, and then concentrating the mixture of foodstuffs and sugar.

5. A method of preparing concentrates from fruit, comprising the steps of: adding sugar to fruit, subjecting the mixture of fruit and sugar to fluid pressure sufficient to rupture the cells of the fruit and impregnate the broken cellular structure of the fruit with the sugar; and ther concentrating the treated mixture under the influence of reduced pressure and at temperatures below the temperatures at which vitamin B and C contents of the fruit are destroyed.

6. A method of preparing concentrates from fruit, comprising the steps of: comminuting fruit, adding sugar to the comminuted fruit, subjecting the mixture of fruit and sugar to fluid pressure sufficient to rupture the cells of the fruit and impregnate the broken cellular structure of the fruit with the sugar, and then concentrating the treated mixture under the influence of reduced pressure and at temperatures below about 115° F.

7. A method of preparing concentrates from fruit, comprising the steps of: comminuting fruit, adding invert sugar to the comminuted fruit in quantity sufficient to impart a content of about 30%–35% of invert sugar to the final concentrate, subjecting the mixture of fruit and sugar to fluid pressure sufficient to rupture the cells of the fruit and impregnate the broken cellular structure of the fruit with the sugar, and then concentrating the treated mixture under the influence of reduced pressure to form a product containing about 20%–25% of water.

BRUNO P. PILORZ.
BERNARD J. BUTLER.